(No Model.) 2 Sheets—Sheet 1.
J. BUTCHER.
OILER AND ATTACHMENT FOR VEHICLES.
No. 369,631. Patented Sept. 6, 1887.
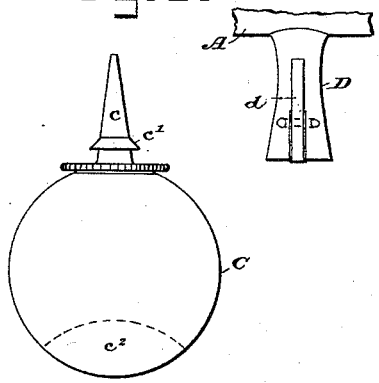
Fig. 1. Fig. 2.
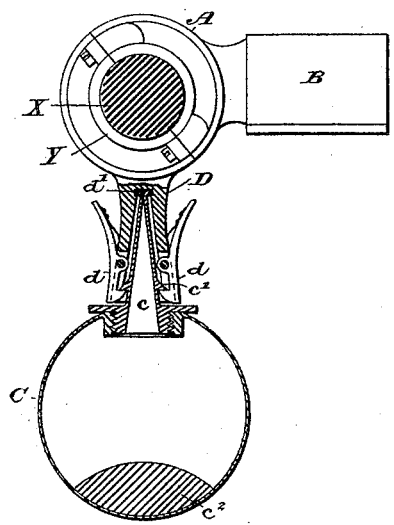
Fig. 3.
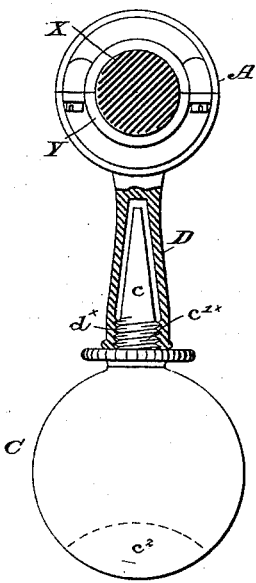
Fig. 4.
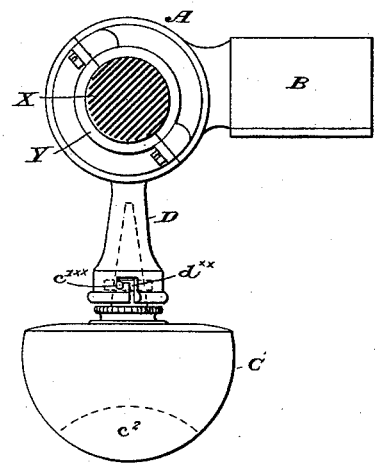
Fig. 5.
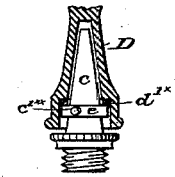
Fig. 5ª
WITNESSES:
E. B. Bolton
INVENTOR:
Joseph Butcher.
By Henry Connett
Attorney.

(No Model.)  2 Sheets—Sheet 2.
J. BUTCHER.
OILER AND ATTACHMENT FOR VEHICLES.
No. 369,631.  Patented Sept. 6, 1887.
Fig. 6.  Fig. 7.
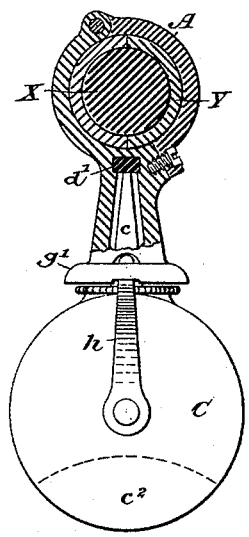
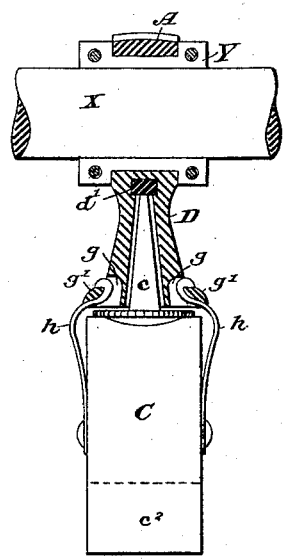
Fig. 8.
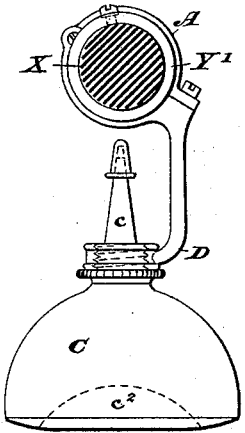
WITNESSES:
E. B. Bolton
INVENTOR:
Joseph Butcher,
By Henry Connett
Attorney.

UNITED STATES PATENT OFFICE.

JOSEPH BUTCHER, OF BOSTON, MASSACHUSETTS.

OILER AND ATTACHMENT FOR VEHICLES.

SPECIFICATION forming part of Letters Patent No. 369,631, dated September 6, 1887.

Application filed April 26, 1887. Serial No. 236,171. (No model.)

*To all whom it may concern:*

Be it known that I, JOSEPH BUTCHER, a citizen of the United States, and a resident of Boston, Suffolk county, Massachusetts, have invented a new Oiler and Attachment for Vehicles, of which the following is a specification.

My invention applies in general to vehicles of various kinds; but it is particularly well adapted to bicycles and tricycles, and especially to this class of vehicles when they are provided with hub-cyclometers of a well-known kind.

The leading object of my invention is to provide a means of attaching an oiler or oil-can to the vehicle so that it may be at hand when wanted for use in oiling the bearings, and a secondary object of my invention is to utilize the oiler or oil-can as a weight to keep a hub-cyclometer or similar instrument in position on the axle and prevent it from revolving with the same.

My invention will be hereinafter fully described, and its novel features carefully defined in the claims.

In the accompanying drawings, which serve to illustrate my invention, Figure 1 shows the oiler or oil-can detached. Fig. 2 shows the socket attachment in elevation; and Fig. 3 shows the oiler secured in the socket attachment, and both in section. This view shows the sleeve on the axle, the housing, and the cyclometer-case in end elevation. Fig. 4 is a view somewhat similar to Fig. 3, illustrating another mode of securing the oiler in its socket. Figs. 5 and $5^a$ illustrate another mode of securing the oiler in its socket. Figs. 6 and 7 illustrate still another mode of securing the oiler in its socket. Fig. 8 illustrates a different form of socket or holder for the oiler. All of these will be fully described hereinafter.

Referring first to Figs. 1, 2, and 3, X represents the axle of a vehicle—as the axle of a bicycle, for example—and Y represents the ordinary sectional sleeve secured thereon to receive the cyclometer clamp or housing A. B is the cyclometer attached to said housing. I would refer to my Letters Patent No. 357,758 of February 15, 1887, for a fuller description of this kind of cyclometer. I will only need to say that in this form of cyclometer I employ a weight of some kind—sometimes a hub-lamp—suspended from the housing, partly for the purpose of preventing the housing and attached cyclometer from rotating with the axle and partly for the purpose of holding the cyclometer face uppermost, so that the dials may be seen conveniently by the rider. I now utilize an oiler or oil-can, C, as a weight to accomplish the objects named above. Pendent from the housing A of the cyclometer is a socket or holder, D, adapted to receive the nozzle $c$ of the oiler, and provided with spring-latch hooks $d$ to catch under a collar or flange, $c'$, on the nozzle of the oiler when the oiler is attached, as clearly shown in Fig. 3. When the nozzle of the oiler is inserted in the socket D, its tip strikes against a cushion-stopper, $d'$, at the bottom of said socket. This stopper may be of leather, rubber, or other cushion-like substance. This cushion serves to close the tip of the nozzle to keep out the dust, and it also serves as a spring to press back the oiler against the latches, so as to steady the oiler and prevent rattling and looseness. The body of the oiler C, I make of thin sheet metal, by preference, and provide it with a leaden mass, $c^2$, at its bottom. This mass serves as a weight to keep the oiler upright when it is set upon the floor, and it also serves to make the oiler heavy enough to hold the cyclometer in the proper elevated position and to keep the housing A from rotating with the axle. The oiler may be readily removed by pressing on the tails of the retaining-latches. It may be attached by inserting the nozzle in the socket and pushing it in until the beveled collar $c'$ wipes past the latch-heads.

Fig. 4 illustrates another mode of attaching the oiler-nozzle $c$ in the socket D. The nozzle is in this case provided with a screw-thread, $c'^{\times}$, which screws into a female screw, $d^{\times}$, in the socket D. In this view I have shown the sectional housing A without any cyclometer attached to it, in order to illustrate the use of my oiler attachment independently of a cyclometer.

Fig. 5 shows the whole device in elevation and illustrates a "bayonet-fastening" for securing the oiler in the socket.

Fig. $5^a$ is a fragmentary view showing the socket D in section. In this construction $d^{\times\times}$ is an L-shaped slot in the wall of the socket D, which is engaged by a stud or screw, $c'^{\times\times}$, in the nozzle $c$ of the oiler. The operation of this form of fastening is too well known to require a full description. In lieu of the cushion $d'$, (seen in Fig. 3,) I employ in this construction a rubber packing cushion or spring, $d'^{\times}$, against which a collar, $e$, on the nozzle bears. This cushion keeps out the dust, and also serves to press back the nozzle and hold the stud $c'^{\times\times}$ pressed down firmly in the recess at the end of slot $d^{\times\times}$, so as to prevent rattling and prevent the oiler from becoming detached by the jolting of the vehicle. I may use the form of cushion-spring $d'$, however, in lieu of that shown in Fig. $5^{a}$.

Figs. 6 and 7 illustrate another means of attaching the oiler to the socket D. Fig. 6 is a view similar to Fig. 4, except that the sleeve Y, housing A, and part of the socket D are in section. The oiler C and the lower part of the socket are in elevation. Fig. 7 is a view taken at right angles to Fig. 6, showing the axle X in side elevation and the housing A and socket D in section. In the walls of the socket D, at its mouth, are formed two oppositely-arranged recessed apertures, $g\ g$, and on the oiler are mounted two spring-latches, $h\ h$, the hook-like heads of which may be passed through said apertures $g$ and made to hook over bars $g'\ g'$, formed in the walls of the socket by such apertures. The manner of engagement is clearly illustrated in Fig. 7.

In Fig. 8 I have shown an open socket or holder, D, in which the oiler is secured, in the same manner as illustrated in Fig. 4. It is not absolutely necessary that the socket D be a closed chamber. In this figure, also, I have omitted the sleeve Y and substituted set-collars Y', to prevent the housing, which rests directly on the axle, from sliding laterally along it.

In Figs. 1, 3, and 4 the oiler C is shown of spherical form, in Figs. 5 and 8 of hemispherical form, and in Figs. 6 and 7 of drum-like form. In all of these the oil may be ejected by pressing the body of the oiler between the thumb and fingers.

I do not wish to limit myself to the use of my invention in connection with bicycles and tricycles, nor to its use in connection with a cyclometer or similar distance-measuring device, although it is primarily intended for such use; nor do I wish to limit myself to any special means of securing the oiler detachably in its socket or holder, as any means may be employed for this purpose. Four devices for the purpose are illustrated herein.

Where a cyclometer is not employed, the "housing" A, so called, may be mounted directly but somewhat loosely on the axle, and the sleeve Y may be omitted. The sleeve, when employed, would serve to keep the housing from sliding laterally along the axle; but set-collars, as seen in Fig. 8, on the axle would serve as well as a sleeve to prevent this.

Having thus described my invention, I claim—

1. The combination, with an oiler or oil-can, of a housing to embrace the axle of a vehicle, said housing having a socket to receive the nozzle of the oiler, and means carried by the oiler and socket for detachably securing the nozzle of said oiler to said socket.

2. The combination, with an oiler or oil-can, of a housing to embrace the axle of a vehicle, said housing having a socket to receive the nozzle of the oiler, a cushion of elastic material in said socket to exclude dust and steady the oiler, and means carried by said oiler and socket for detachably securing the nozzle of the oiler in said socket.

3. The combination, with an oiler or oil-can provided with a collar on its nozzle, of a housing to embrace the axle of a vehicle, said housing having a close dust-excluding socket to receive the nozzle of the oiler, and spring-latches pivoted in the walls of said socket to take under the collar on the oiler-nozzle, and thus hold the oiler in place.

4. The combination, with an oiler or oil-can provided with a collar, $c'$, on its nozzle, of the housing A, having a socket, D, to receive the nozzle of the oiler, spring-latches $d\ d$ on said socket, and a cushion, $d'$, in said socket, substantially as set forth.

5. The combination, with the housing and the means of detachably securing the oiler thereto, of the oiler having a spherical or rounded form and provided with a weight, and a cyclometer attached to said housing and projecting therefrom at right angles to the oiler, substantially as set forth.

6. The combination, with the housing and the means of detachably securing the oiler thereto, of the oiler having a spherical or rounded body and provided with a weight, $c^2$, substantially as set forth.

In witness whereof I have hereunto signed my name in the presence of two subscribing witnesses.

JOSEPH BUTCHER.

Witnesses:
WILLIAM L. ROSS,
GIDEON HAYNES, Jr.